United States Patent [19]
Jouret

[11] 4,192,198
[45] Mar. 11, 1980

[54] TWO GEAR TRAIN REDUCTION MECHANISM

[75] Inventor: Edouard Jouret, Bresso-Milano, Italy

[73] Assignee: Crouzet, Paris, France

[21] Appl. No.: 851,625

[22] Filed: Nov. 15, 1977

[30] Foreign Application Priority Data

Nov. 25, 1976 [FR] France ................ 76 35634

[51] Int. Cl.² .......................................... F16H 35/00
[52] U.S. Cl. ........................................ 74/384; 74/405
[58] Field of Search .................... 74/384, 405, 25

[56] References Cited

U.S. PATENT DOCUMENTS

| 2,642,756 | 6/1953 | Cummings | 74/384 X |
| 4,034,619 | 7/1977 | Seregni | 74/384 |

Primary Examiner—William E. Wayner
Assistant Examiner—William E. Tapolcai, Jr.
Attorney, Agent, or Firm—Jacobs & Jacobs

[57] ABSTRACT

This invention relates to a reduction mechanism including two gear trains, of different speed reductions, for rotating one cam, both gear trains having different input gears but a same output gear, said input gears being rotatable by a step-up gear mounted on a pivotable lever and rotatable by a driving pinion coupled to a motor, a second pivotable lever having followers responsive to ramp means provided on said cam for suddenly pivoting said first lever through a spring linked to said two levers and thus moving said step-up gear into engagement with the input gear of one or the other of said two gear trains.

1 Claim, 2 Drawing Figures

TWO GEAR TRAIN REDUCTION MECHANISM

BACKGROUND OF THE INVENTION

The invention relates to a two gear train reduction mechanism, in particular for the programmer of a domestic washing machine, in which a reversing cam, for actuating reversing contacts, is rotated by a motor over a predetermined angular space and through a first reduction gear train whose speed reduction is compatible with the proper operation of the reversing contacts, the cam being further rotated over the rest of its revolution by same motor through a second reduction gear train of a different speed reduction, so that the total duration of the revolution of the cam be that selected for the cycle of a periodical phenomenon programmed by said cam.

A reduction mechanism having two gear trains of different speed reductions is already indicated by the U.S. Pat. No. 378,240. But these two gear trains are not provided for engaging alternately a single cam. On the contrary, they engage two different cams, respectively, the second gear train engaging constantly the second cam.

Moreover a several gear train reduction mechanism is indicated by the British Patent No. 929,461, which is provided for engaging a single cam through a single step-up gear engaging alternately either of the gear trains, said step-up gear being mounted on a pivotable lever.

Finally, such a mechanism including an uncoupling spring mounted in a way to act suddenly is indicated by the French Patent No. 942,316.

SUMMARY OF THE INVENTION

The invention relates to a reduction mechanism for rotating a reversing cam to actuate reversing contacts of a domestic washing machine, including a driving pinion, coupled to a motor, and engaging two gear trains of different speed reductions through a step-up gear carried on a pivotable lever. The two gear trains have different input gears but a same output gear. The step-up gear is disengaged from the input gear of one of said gear trains and moved into engagement with the input gear of the other of said gear trains under the action of a spring which pivots suddenly said pivotable lever.

But the fact that the two gear trains have the same output gear for driving the same cam and that a step-up gear is carried on a lever which can be suddenly pivoted under the action of a spring so that the cam is driven by either of the gear trains, doesn't solve the problem set by the present invention.

It is, therefore, an object of this invention to provide a new and improved two gear train reduction mechanism.

Accordingly, the present invention is concerned with a two gear train reduction mechanism of the kind specified, wherein said cam is provided with ramp means and a second pivotable lever is provided with two followers responsive to said ramp means, the spring being linked to said two levers, whereby when the link between said spring and said second lever, as said second lever is pivoted by said cam driven through one of said two gear trains, gets across the line extending from the pivoting axis of the first lever carrying said step-up gear and the link between said spring and the second lever, said second lever pivots said first lever, so that the cam is suddenly driven through the other of said two gear trains.

These and other objects of the invention will become more apparent from the following description taken in conjunction with the accompanying drawings.

DESCRIPTION OF THE PREFERRED EMBODIMENT OF THE INVENTION

Figure 1:
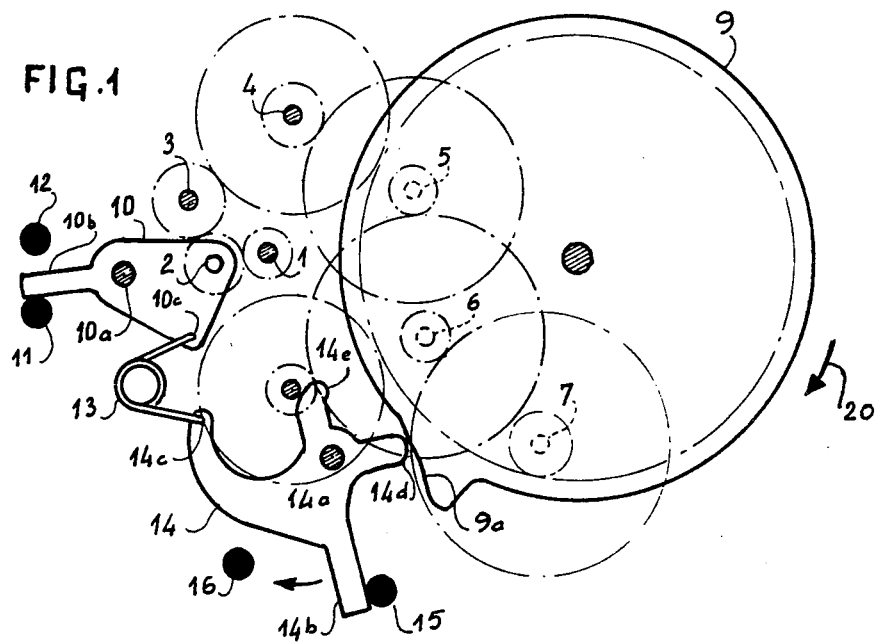
FIG. 1 is a schematic view showing the reduction mechanism according to the invention, in a state where the cam is driven through the first speed reduction gear train, and slightly before changing of speed reduction.

Referring to FIG. 1, a driving pinion 1, coupled to a motor, not shown, rotates a cam 9 in a direction represented by arrow 20, through a step-up gear rotatable on a spindle 2 and a first gear train comprising gears rotatable on spindles 3, 4, 5, 6 and 7, respectively, gears 4 to 7 being provided each with a driven toothed portion and a driving toothed portion.

Figure 2:
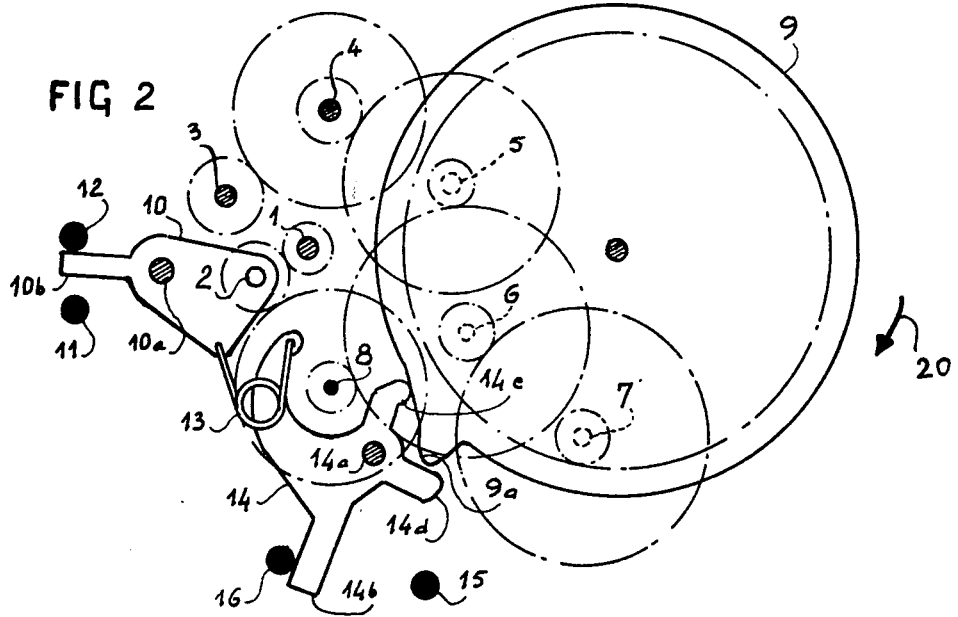
FIG. 2 is a schematic view showing the same reduction mechanism, in a state where the cam is driven through the second speed reduction gear train, and slightly before changing again of speed reduction.

Referring to FIG. 2, same driving pinion 1 rotates the cam 9 in the same direction through the same step-up gear 2 and a second gear train comprising gears 6 and 7 and a gear 8 rotatable on a spindle 8 and also provided with a driven toothed portion and a driving toothed portion.

Both gear trains have different input gears 3 and 8, respectively, and the same output gear 7, and their speed reductions are therefore different.

The step-up gear 2 is carried on a first lever 10 pivotally mounted on an axis 10a and provided with an arm 10b which presses against a fixed stop pin 11 in the stable limiting position shown in FIG. 1, and which presses against an other stop pin 12 in the stable limiting position shown in FIG. 2.

A spring 13 is linked to the first lever 10, through a hole 10c in the first lever 10, and to a second lever 14, through a hole 14c in the second lever 14, said second lever 14 being pivotally mounted on an axis 14a and provided with an arm 14b which presses against a fixed stop pin 15 in the stable limiting position shown in FIG. 1, and which presses against an other stop pin 16 in the stable limiting position shown in FIG. 2.

The second pivotable lever 14 is provided with two other arms 14d and 14e being cam followers responsive to cam 9 which is provided with a ramp means 9a.

From the position shown in FIG. 1, the ramp 9a of the cam 9 will bias the follower 14d to slowly pivot the lever 14 in the clockwise direction. The arm 14b will be disengaged from the stop pin 15 to move towards the stop pin 16. When the hole 14c gets across the stability line extending from the axis 10a to the link 10c, the lever 10 is suddenly pivoted to move into the position represented in FIG. 2, whereby the arm 10b of the lever 10 is moved towards the stop pin 12. From this moment, the lever 14 is then suddenly pivoted until the arm 14b presses against the stop pin 16 whereby the follower 14e shall be latter, for the return movement, responsive to the ramp 9a of the cam 9 to move the lever 14 in the counter clockwise direction, back to its original position shown in FIG. 1.

When the cam 9 is driven by the step-up gear 2 and the second gear train (8, 6, 7) of FIG. 2, cam 9 is rotated over a predetermined angle during a period of time $t_1$, and other cams, not shown, coupled to the cam 9, actuate reversing contacts, not shown. The gear train 8, 6, 7 is designed for a rotation speed compatible with the proper operation of said reversing contacts.

The rest of the revolution of the cam 9 is achieved within a period of time $t_2$, through the step-up gear 2 and the first gear train 3, 4, 5, 6, 7. This first gear train is designed so that the total duration $T = t_1 + t_2$ be the selected period of time for the complete revolution of the cam 9.

From the above, it may be seen that the present invention provides a simple and economical mechanism for programmers, in particular those for the domestic washing machines, whose reversing cam actuates electrical contacts under predetermined conditions for complying with interference standards.

What is claimed is:

1. A reduction mechanism comprising a first gear train having an input gear and an output gear, a second gear train having an input gear and the same output gear as said first gear train, said first and second gear trains being of different speed reductions, a cam engaged by said output gear, a motor, a driving pinion rotated by said motor, a first lever provided with an arm and pivotally mounted on a first axis, a step-up gear supported on said first lever and engaged by said driving pinion, a first fixed stop pin and a second fixed stop pin, a spring for suddenly pivoting said first lever from a first stable limiting position, in which said arm presses against said first stop pin and said step-up gear rotates the input gear of said first gear train, to a second stable limiting position, in which said arm presses against said second stop pin and said step-up gear rotates the input gear of said second gear train, a second lever provided with an arm and two followers and pivotally mounted on second axis, each of said two levers being linked to a respective end of said spring, a third fixed stop pin and a forth fixed stop pin, said cam being arranged for engaging either of said two followers and thus for pivoting said second lever from a first stable limiting position, in which the arm of said second lever presses against said third stop pin, to a second stable limiting position, in which the arm of said second lever presses against said fourth stop pin, whereby when the link between said spring and said second lever, as said second lever is pivoted by said cam, gets across the stability line extending from said first axis to the link between said spring and said first lever, said second lever suddenly pivots said first lever supporting said step-up gear.

* * * * *